United States Patent
Ion

(10) Patent No.: US 10,356,335 B2
(45) Date of Patent: Jul. 16, 2019

(54) CAMERA SHADES

(71) Applicant: Apple Inc., Cupertino, CA (US)

(72) Inventor: Lucian Ion, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/708,518

(22) Filed: Sep. 19, 2017

(65) Prior Publication Data

US 2018/0091717 A1   Mar. 29, 2018

Related U.S. Application Data

(60) Provisional application No. 62/398,593, filed on Sep. 23, 2016.

(51) Int. Cl.

| | |
|---|---|
| *H04N 5/225* | (2006.01) |
| *H04N 5/238* | (2006.01) |
| *H04N 5/235* | (2006.01) |
| *G03B 7/085* | (2006.01) |
| *G03B 7/095* | (2006.01) |
| *G03B 7/18* | (2006.01) |
| *G03B 17/04* | (2006.01) |
| *G03B 17/56* | (2006.01) |
| *B60R 11/04* | (2006.01) |
| *G02B 5/20* | (2006.01) |
| *G02B 5/30* | (2006.01) |
| *G02F 1/163* | (2006.01) |
| *G05D 1/02* | (2006.01) |

(52) U.S. Cl.
CPC ............. *H04N 5/238* (2013.01); *G03B 7/085* (2013.01); *G03B 7/095* (2013.01); *G03B 7/18* (2013.01); *G03B 17/04* (2013.01); *G03B 17/56* (2013.01); *H04N 5/2254* (2013.01); *H04N 5/2351* (2013.01); *B60R 11/04* (2013.01); *G02B 5/20* (2013.01); *G02B 5/30* (2013.01); *G02F 1/163* (2013.01); *G05D 1/0231* (2013.01)

(58) Field of Classification Search
CPC ...................................... H04N 5/225
USPC .............................. 348/222.1, 362
See application file for complete search history.

(56) References Cited

U.S. PATENT DOCUMENTS

| | | | |
|---|---|---|---|
| 8,000,598 B1 * | 8/2011 | Tsai ..................... | G03B 11/045 359/611 |
| 2005/0117027 A1 * | 6/2005 | Fukuhara ................ | B60R 11/04 348/222.1 |

(Continued)

FOREIGN PATENT DOCUMENTS

WO   WO-2015178867 A1   11/2015

OTHER PUBLICATIONS

International Search Report and Written Opinion for Application No. PCT/US2017/052189, dated Nov. 24, 2017, 13 pages.

(Continued)

*Primary Examiner* — Anthony J Daniels
(74) *Attorney, Agent, or Firm* — Sterne, Kessler, Goldstein & Fox P.L.L.C.

(57) ABSTRACT

An imaging device can include an image sensor, a control unit coupled to the image sensor, and a light blocking element coupled to the control unit. The control unit can be configured to adjust the light blocking element in response to image information received from the image sensor. The light blocking element can be configured to regulate light received at the image sensor.

19 Claims, 9 Drawing Sheets

(56) References Cited

U.S. PATENT DOCUMENTS

| | | | | |
|---|---|---|---|---|
| 2008/0007645 A1* | 1/2008 | McCutchen | ........... | H04N 5/238 |
| | | | | 348/360 |
| 2008/0068735 A1* | 3/2008 | Goldsmith | ............. | G02B 5/201 |
| | | | | 359/891 |
| 2009/0059033 A1* | 3/2009 | Shimada | ................ | B25J 19/022 |
| | | | | 348/229.1 |
| 2014/0009615 A1* | 1/2014 | Kiyohara | ................. | H04N 7/18 |
| | | | | 348/148 |
| 2014/0300805 A1 | 10/2014 | Davis et al. | | |
| 2014/0340777 A1 | 11/2014 | Konishi et al. | | |
| 2015/0049204 A1 | 2/2015 | Okabe et al. | | |
| 2015/0062422 A1* | 3/2015 | Stern | .................... | H04N 5/2254 |
| | | | | 348/374 |
| 2017/0123293 A1* | 5/2017 | Yuen | ....................... | B60R 11/04 |
| 2017/0359495 A1* | 12/2017 | Hawes | ................... | H04N 5/238 |

OTHER PUBLICATIONS

International Search Report and Written Opinion for Application No. PCT/US2017/052189, dated Apr. 4, 2019, 7 pages.

\* cited by examiner

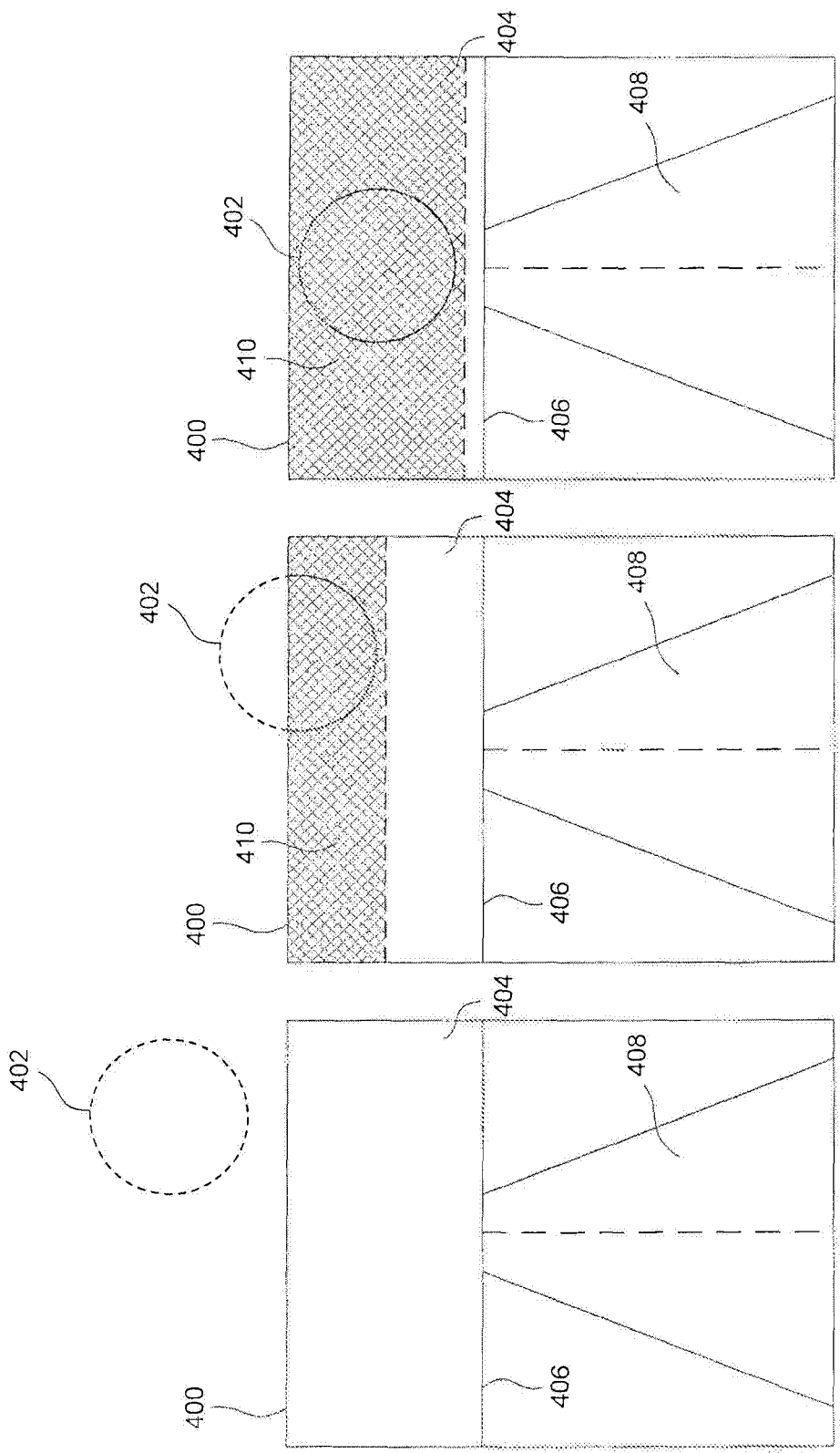

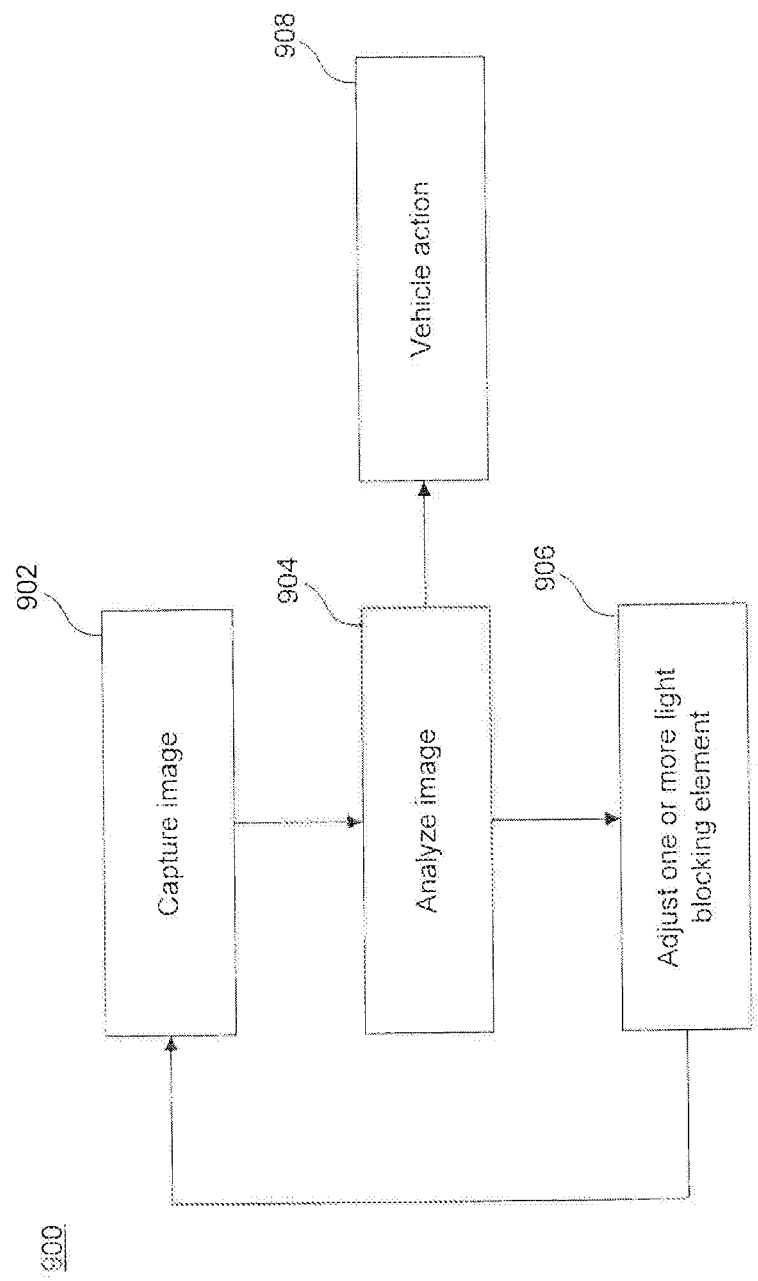

CAMERA SHADES

BACKGROUND

Field

The present disclosure relates to camera shades. More specifically, embodiments of the present disclosure relate to light blocking elements (i.e., camera shades) configured to regulate light reaching an image sensor of a camera.

Background

Imaging devices, such as cameras, focus light from a scene onto an image sensor. Some vehicles use one or more cameras in a vehicle vision system to assist, for example, with lane changes, parking, and rearward view while performing a reversing maneuver. These vehicle vision systems can provide additional information to a vehicle operator, allowing the operator to make safe driving decisions.

In an autonomous vehicle, the accuracy and reliability of a vehicle vision system is even more important for safety because the autonomous vehicle may not have a mechanism for a human operator to override the autonomous vehicle maneuvers. The imaging devices (e.g., cameras) may experience operating conditions with various light conditions that affect the vehicle vision system, and ultimately maneuvering the autonomous vehicle. For example, nighttime driving may have low light levels, but also glare, for example, from street lights or other vehicles. Daytime driving, while having generally higher light levels than nighttime driving, can have changes in light levels, for example, from overcast skies or when entering a tunnel. Glare, for example, from the sun or off of the roadway, can also affect the vehicle vision system. Changes in lighting conditions can occur suddenly and impact the scene captured by the imaging devices. Therefore, an autonomous vehicle vision system should be able to perform in many kinds of lighting conditions.

BRIEF SUMMARY

In some embodiments, an imaging device can include an image sensor, a control unit coupled to the image sensor, and a light blocking element coupled to the control unit. In some embodiments, the control unit can be configured to adjust the light blocking element in response to image information received from the image sensor. In some embodiments, the image information can include light intensity and/or light angle. In some embodiments, the light blocking element can be configured to regulate light received at the image sensor.

In some embodiments, the imaging device can include an actuator coupled to the control unit and the light blocking element. In some embodiments, the actuator can be configured to adjust a position of the light blocking element. In some embodiments, the actuator can be configured to translate the light blocking element. In some embodiments, the actuator can be configured to rotate the light blocking element. In some embodiments, the actuator can be configured to both translate and rotate the light blocking element.

In some embodiments, the control unit can be an electronic control unit. In some embodiments, the actuator can be electrically coupled to the control unit by a wire. In some embodiments, the actuator can be wirelessly coupled to the control unit.

In some embodiments, the light blocking element can be a baffle disposed inside (i.e., an internal baffle) an optical chamber of the imaging device. In some embodiments, the light blocking element can be a baffle coupled to an exterior (i.e., an external baffle) of a housing of the imaging device.

In some embodiments, the light blocking element can be a polarized filter. In some embodiments, the light blocking element can be an electrochromic filter. In some embodiments, the control unit can be configured to adjust an opacity of the electrochromic filter. In some embodiments, the control unit can be configured to adjust an opacity of a first portion of the electrochromic filter and an opacity of a second portion of the electrochromic filter, such that the opacity of the first portion is greater than the opacity of the second portion. In some embodiments, the imaging device can include one or more lens elements disposed in optical communication with the image sensor.

In some embodiments, the imaging device can include a second light blocking element coupled to the control unit and the control unit can be configured to adjust the second light blocking element in response to the image information received from the image sensor. In some embodiments, the imaging device can include one or more stray light sensors coupled to the control unit.

In some embodiments, an imaging device can include an image sensor, one or more lens elements disposed in optical communication with the image sensor, an electronic control unit coupled to the image sensor, and a first and second light blocking element coupled to the electronic control unit. The first and second light blocking elements can be selected from the group of an interior baffle, an exterior baffle, and a filter element. A first actuator can be coupled to the electronic control unit and the first light blocking element, and the electronic control unit can be configured to adjust the first light blocking element with the first actuator in response to image information received from the image sensor. A second actuator can be coupled to the electronic control unit and the second light blocking element, and the electronic control unit can be configured to adjust the second light blocking element in response to the image information received from the image sensor.

In some embodiments, a vehicle can include a vision system having at least one camera. In some embodiments, a first camera can include an image sensor, an electronic control unit coupled to the image sensor, and a light blocking element coupled to the electronic control unit. In some embodiments, the electronic control unit can be configured to adjust the light blocking element to regulate light received at the image sensor. In some embodiments, the vehicle can be an autonomous vehicle. In some embodiments, the vehicle can be an electric vehicle.

In some embodiments, the vision system can include two or more cameras. In some embodiments, the vision system can include twelve cameras. In some embodiments, the first camera can have a field of view in a direction of forward travel of the vehicle. In some embodiments, the vision system can include a second camera having a second image sensor, a second electronic control unit coupled to the second image sensor, and a second light blocking element coupled to the second electronic control unit. In some embodiments, the second electronic control unit can be configured to adjust the second light blocking element to regulate light received at the second image sensor. In some embodiments, the first camera and the second camera can be disposed on a front end of the vehicle and have a field of view in a direction of forward travel of the vehicle.

In some embodiments, the vehicle can include a central processing unit coupled to the first electronic control unit and the second electronic control unit. In some embodiments, the first and second electronic control units can be configured to provide information to the central processing unit. In some embodiments, the central processing unit can be configured to communicate a vehicle maneuver in response to the information. In some embodiments, the vehicle maneuver can be at least one of braking, accelerating, or turning.

In some embodiments, an imaging system for an autonomous vehicle can include a plurality of cameras. In some embodiments, a first camera can include an image sensor, an electronic control unit coupled to the image sensor, and at least two light blocking elements coupled to the electronic control unit, selected from a group including an interior baffle, an exterior baffle, and a filter element. In some embodiments, the electronic control unit can be configured to adjust the light blocking elements. In some embodiments, the imaging system can include a first actuator coupled to a first light blocking element and the electronic control unit, and a second actuator coupled to a second light blocking element and the electronic control unit.

In some embodiments, the light blocking elements can be an internal baffle and an external baffle. In some embodiments, the electronic control unit can be configured to translate, rotate, or translate and rotate the internal baffle and the external baffle. In some embodiments, the imaging system can include a first lens element disposed optically between the external baffle and the internal baffle and a second lens element disposed optically between the internal baffle and the image sensor.

In some embodiments, one light blocking element can be a filter disposed in optical communication with a lens element. In some embodiments, the electronic control unit can be configured to remove the filter from optical communication with the lens element when a light intensity detected by the image sensor is below a threshold.

In some embodiments, a method of operating an autonomous vehicle can include capturing a first image with an image sensor, analyzing the first image with a control unit, and adjusting one or more light blocking elements configured to regulate light received at the image sensor. In some embodiments, adjusting a first light blocking element can include translating the first light blocking element. In some embodiments, adjusting a first light blocking element can include rotating the first light blocking element. In some embodiments, adjusting a first light blocking element can include changing an opacity of an electrochromic filter.

In some embodiments, the method can include maneuvering the autonomous vehicle in response to analyzing the image with the control unit. In some embodiments, maneuvering the vehicle can include at least one of braking, accelerating, or turning.

In some embodiments, the method can include capturing a second image with the image sensor, analyzing the second image with the control unit, and adjusting the one or more light blocking elements. In some embodiments, the control unit can be an electronic control unit.

In some embodiments, a method of reducing glare received by a camera can include sensing light at an image sensor of the camera, determining, by an electronic control unit, an adjustment of one or more light blocking elements, and adjusting the one or more light blocking elements to reduce light received at the image sensor. In some embodiments, adjusting the one or more light blocking elements can include adjusting a baffle disposed within an optical chamber of the camera. In some embodiments, adjusting the one or more light blocking elements can include adjusting a baffle coupled to an exterior of a housing of the camera. In some embodiments, adjusting the one or more light blocking elements can include adjusting an opacity of an electrochromic filter. In some embodiments, adjusting the one or more light blocking elements can reduce a light intensity at the image sensor by at least 10 percent. In some embodiments, the electronic control unit can be configured to determine an angle of light reaching the image sensor.

In some embodiments, a non-transitory computer-readable storage device can have instructions stored thereon that, when executed by at least one computing device, causes the at least one computing device to perform operations including determining an adjustment of one or more light blocking elements for an imaging device and adjusting the one or more light blocking elements to reduce light received at an image sensor of the imaging device. In some embodiments, determining the adjustment can include determining a light intensity and a light angle. In some embodiments, adjusting the one or more light blocking elements can include at least one of adjusting a position of a baffle and adjusting an opacity of an electrochromic filter. In some embodiments, the operations can include maneuvering an autonomous vehicle.

BRIEF DESCRIPTION OF THE DRAWINGS/FIGURES

The accompanying drawings, which are incorporated herein and form a part of the specification, illustrate the embodiments and, together with the description, further serve to explain the principles of the embodiments and to enable a person skilled in the relevant art(s) to make and use the embodiments.

FIGS. 4A-C illustrate example scenes captured by an imaging device, according to embodiments.

Figure 5B:
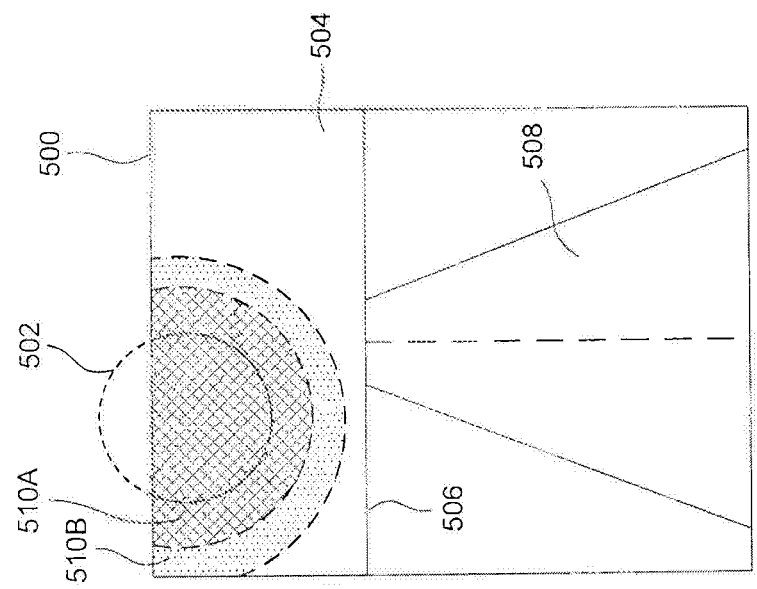
Figure 5A:
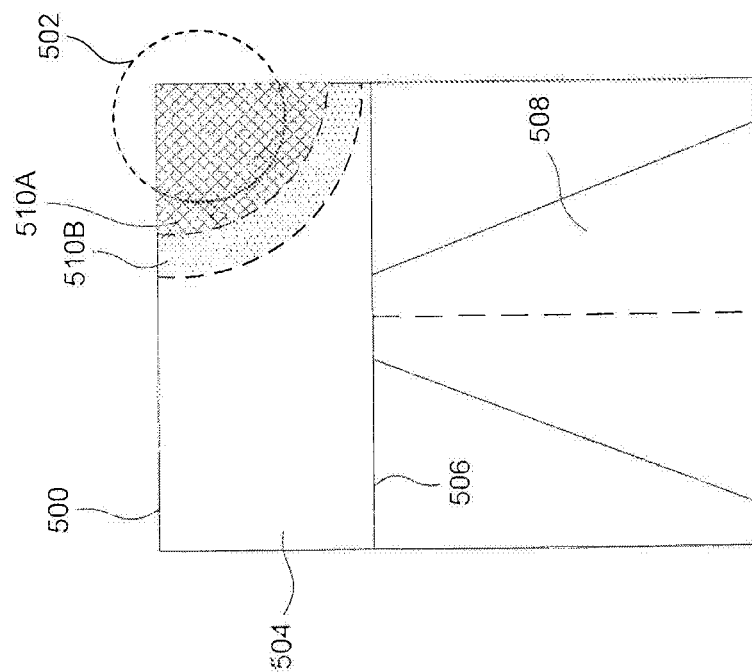

FIGS. 5A and 5B illustrate example scenes captured by an imaging device, according to embodiments.

Figure 6A:
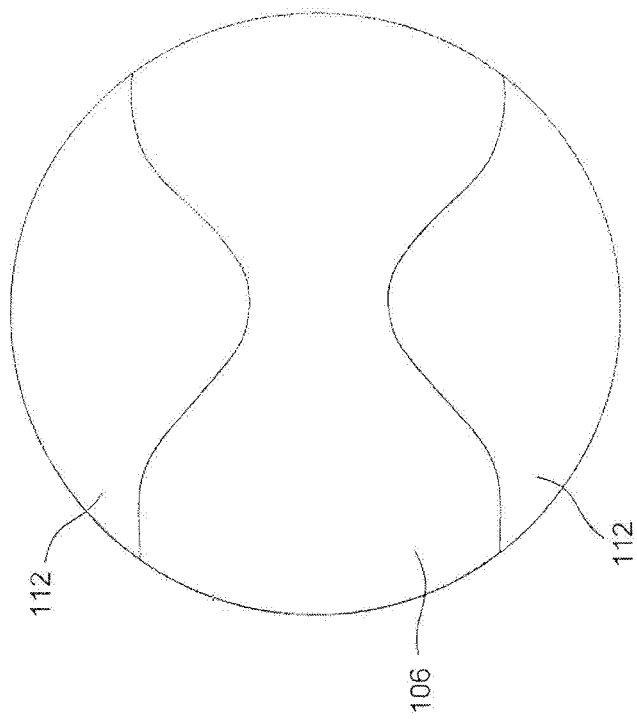
Figure 6B:
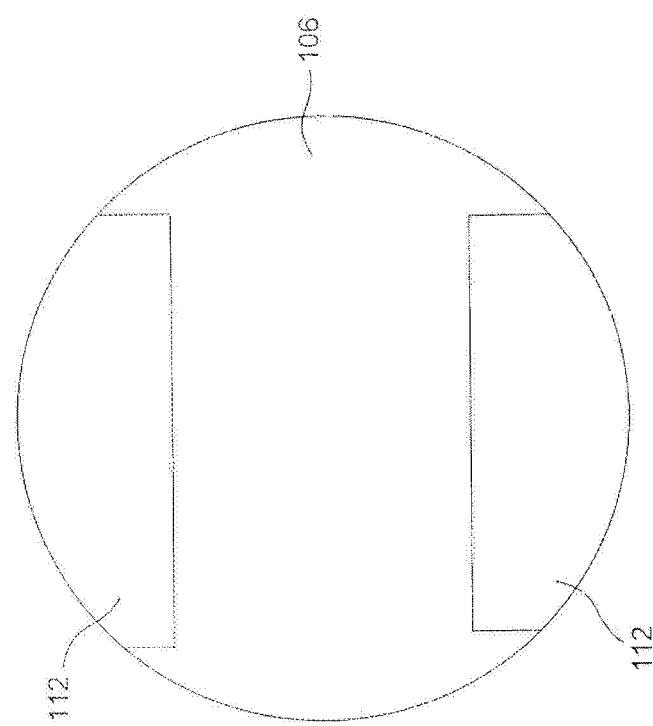

FIGS. 6A and 6B illustrate front views of camera shades, according to embodiments.

Figure 7:
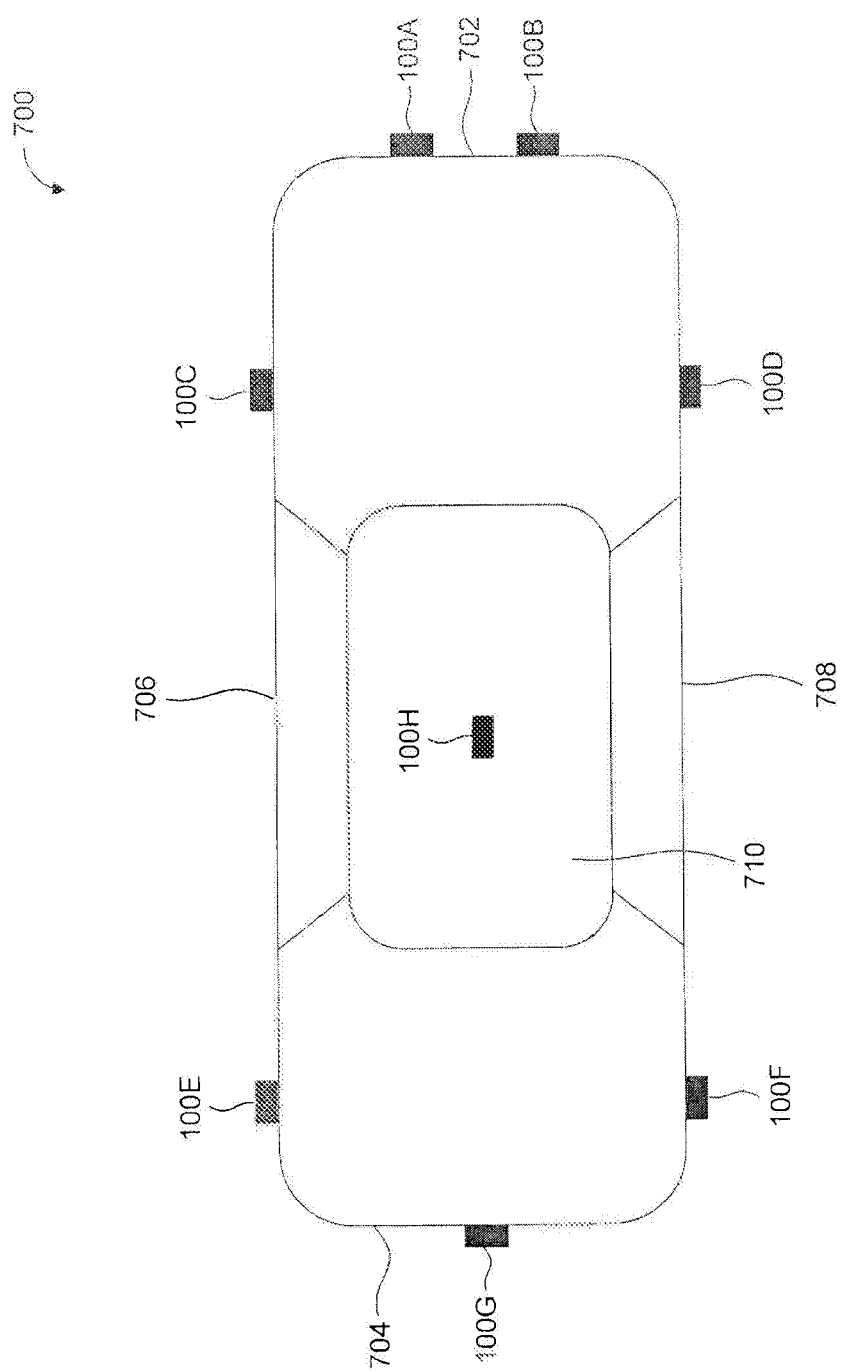

FIG. 7 illustrates a top view of a vehicle having cameras, according to an embodiment.

Figure 8:
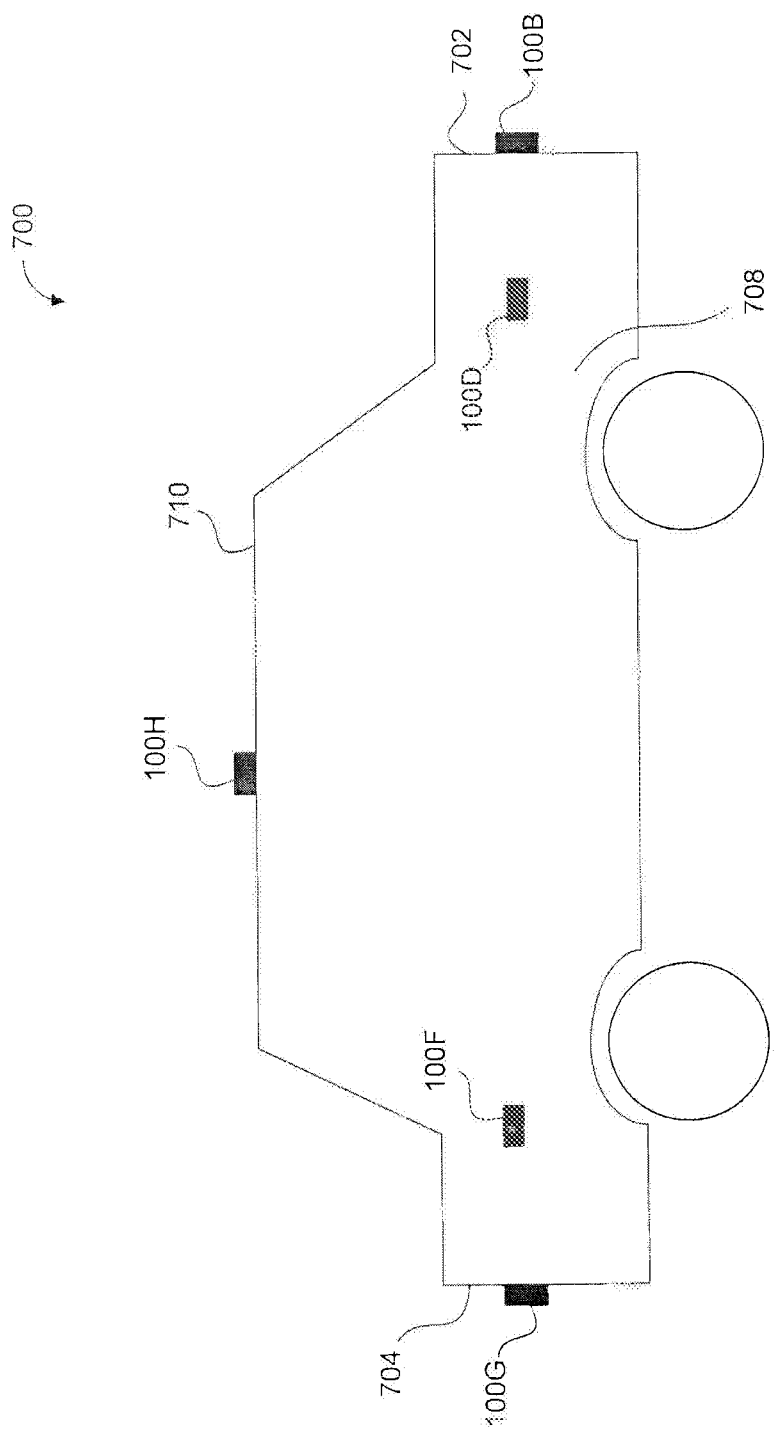

FIG. 8 illustrates a side view of a vehicle having cameras, according to an embodiment.

FIG. 9 illustrates a process for adjusting light blocking elements of a camera, according to an embodiment.

The features and advantages of the embodiments will become more apparent from the Detailed Description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

The devices, systems, and methods described herein can be used to regulate light received at an image sensor, and ultimately as part of maneuvering an autonomous vehicle. Because outdoor lighting conditions can change frequently and abruptly it is important, in particular, for autonomous vehicle vision systems to be able to quickly adjust the amount of light received at the image sensor. This provides improved safety and reliability to the system, which will result in fewer errors made in response to, for example, unusual lighting conditions. For example, some embodiments described herein include one or more mechanism for blocking light received at the image sensor. These mechanisms can be quickly adjusted in response to light received at the image sensor, for example, to reduce glare from direct sunlight or from light reflected off of the roadway. Ultimately, the devices, systems, and methods described herein will make autonomous driving, and vehicle transportation generally, safer.

These challenges are unique to autonomous driving in that vehicle maneuvers may be taken by the autonomous vehicle based on sensed lighting conditions. The safety of the vehicle occupants and others on the roadway may be compromised if, for example, the autonomous vehicle does not recognize an object in its path because of glare. In contrast, glare produced in an image of a backup camera system can be overcome by the vehicle operator's own vision. And while lighting conditions for photography may affect the aesthetic quality of a captured image, it does not affect the operator's safety and the person capturing the image may simply take another photograph if, for example, there is glare.

Figure 1:
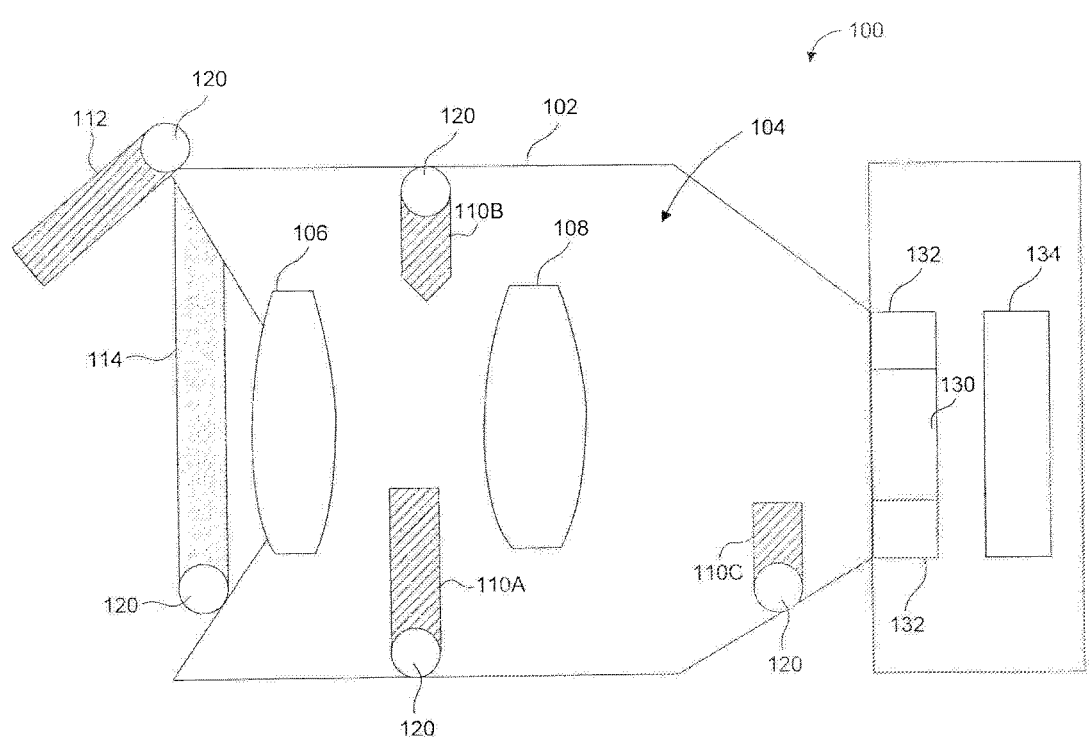
FIG. 1 illustrates a schematic view of a camera, including a partial interior view, according to an embodiment.

FIG. 1 illustrates camera 100, according to an embodiment. In some embodiments, camera 100 can be an imaging device for a vision system of an autonomous vehicle. Camera 100 can include one or more light blocking elements, for example, but not limited to, one or more internal baffles 110A-C, external baffle 112, and/or filter element 114. The light blocking elements can attenuate light reaching image sensor 130, for example, by providing a physical obstruction in the pathway of the light, as shown, for example, in FIG. 2. One benefit of attenuating light is the reduction of glare, which can interfere with the proper operation of an autonomous vehicle.

In some embodiments, camera 100 can have one or more internal baffle disposed at various locations within optical chamber 104 inside housing 102 of camera 100. For example, camera 100 can have one, two, three, four, or more internal baffles disposed in optical chamber 104. As described herein, optical chamber 104 refers to the space inside of housing 102 of camera 100 where light may enter, for example, through first lens element 106. The optical chamber 104 can extend through the housing 102 such that light can reach image sensor 130.

Internal baffles, for example internal baffles 110A-C, can be configured to block light that enters optical chamber 104 at particular angles. In some embodiments, internal baffles 110A-C can be made from an opaque material so that light cannot pass through the material. The internal baffles can be various shapes, sizes, lengths, etc. and can be positioned at various locations and orientations in order to block light rays entering optical chamber 104, preventing those light rays from reaching image sensor 130 of camera 100 at a rear of optical chamber 104. For example, the internal baffles can be rectangular, triangular, semi-circular, or shaped like an obelisk. The internal baffles can be disposed vertically, as shown in FIG. 1, or at an angle relative to vertical.

In some embodiments, internal baffles 110A-C can be coupled to an actuator 120. The actuator 120 can be configured to adjust the position of the internal baffles. For example, in some embodiments, actuator 120 can be a piezo-electric actuator configured to move internal baffles 110A-C. For example, the actuators 120 can move internal baffles 11 OA-C in a vertical direction (lift), horizontal direction (slide), and/or in a rotational direction (tilt) about actuator 120. In some embodiments the actuators 120 can be configured to move about 5-100 mm in each direction. In some embodiments, the actuators can be configured to move about 10-20 mm in each direction. By moving internal baffles 110A-C, light entering optical chamber 104 can be blocked from reaching image sensor 130. In some embodiments, an electronic control unit (ECU) 134 can be configured to control any of the actuators 120 described herein.

In some embodiments, camera 100 can include one or more external baffle 112. In some embodiments, external baffle 112 can be coupled to an exterior of housing 102 of camera 100. External baffle 112 can be similar to internal baffles 110A-C in size, shape, material, etc. External baffle 112, however, is configured to block light rays from entering optical chamber 104. In some embodiments, external baffle 112 can be coupled to an actuator 120, which can be configured to adjust the position of external baffle 112. For example, actuator 120 can move external baffle 112 in a lengthwise direction of external baffle 112 or rotate external baffle 112 about actuator 120. In some embodiments, actuator 120 can be a piezo-electric actuator configured to move external baffle 112.

In some embodiments, camera 100 can include filter element 114. In some embodiments, filter element 114 can be disposed outside of optical chamber 104, as shown, for example, in FIG. 1. In some embodiments, filter element 114 can be disposed within housing 102 of camera 100 in the optical chamber 104.

In some embodiments, filter element 114 can be a polarized lens. As such, filter element 114 can be used to reduce the amount of reflected light entering optical chamber 104. In some embodiments, filter element 114 can be coupled to an actuator 120, which is configured to move filter element 114. For example, in some embodiments, when filter element 114 is a polarized lens, actuator 120 can move filter element 114 such that filter element 114 is in optical communication with optical chamber 104 and image sensor 130. That is, filter element 114 can be disposed in front of an opening to optical chamber 104, for example, first lens element 106. In some embodiments, actuator 120 can move filter element 114 such that it is not disposed in front of an opening to optical chamber 104. For example, actuator 120 can rotate filter element 114 such that it is not disposed in front of first lens element 106. In some embodiments, ECU 134 can be configured to move filter element 114 out of optical communication with optical chamber 104 when a light intensity falls below a threshold level detected by image sensor 130. This can remove filter element 114 at nighttime, for example, when it may not be needed to reduce glare from sunlight.

In some embodiments, filter element 114 can be an electrochromic filter. In some embodiments, when filter element 114 is an electrochromic filter, actuator 120 can be configured to activate filter element 114. That is, actuator 120 can be configured to change the opacity of the electrochromic filter, making portions lighter or darker (i.e., tinting) by passing a current through the electrochromic filter. For example, actuator 120 can be a driver circuit that is configured to apply a variable activation voltage to portions of the electrochromic filter. In some embodiments, the electrochromic filter can have one or more portions that are darker than other portions of the electrochromic filter. For example, an upper portion of the electrochromic filter can be darker than a bottom portion of the electrochromic filter when the sun is in an upper part of the scene captured by camera 100. In some embodiments, certain portions of the electrochromic filter may not be tinted at all. In some embodiments, the tinted portion can be a free-form shape. In some embodiments, the tinted portion can be tinted in a gradient. As shown, for example in FIGS. 5A-B, a portion of the electrochromic filter actuated to block the sun may be very dark and the filter may get progressively lighter with increasing distance from the position of the sun in the captured scene.

In some embodiments, camera 100 can include one or more optical element, for example, one, two, three, four, or more lenses. The optical elements can be configured to focus light onto image sensor 130. In some embodiments, camera 100 can include first lens element 106 and/or second lens element 108, as shown, for example, in FIG. 1. In some embodiments, first lens element 106 and/or second lens element 108 can be disposed in optical chamber 104 of camera 100. In some embodiments, first lens element 106 can be disposed at an opening to optical chamber 104 and define an outer boundary of optical chamber 104. In some embodiments, first lens element 106 and/or second lens element 108 can be in optical communication with filter element 114. In some embodiments, one or more internal baffles 110A-B can be disposed between first lens element 106 and second lens element 108. In some embodiments, one or more internal baffle 110C can be disposed between second lens element 108 and image sensor 130.

In some embodiments, camera 100 can include image sensor 130, one or more stray light sensors 132, and/or electronic control unit (ECU) 134. Image sensor 130 can receive light reaching a rear portion of optical chamber 104. As described herein, light blocking elements can be used to regulate the light reaching image sensor 130. This can affect the quality of the image captured by camera 100. In some embodiments, one or more stray light sensors 132 can be disposed adjacent to image sensor 130. Stray light sensors 132 can be configured to detect light reaching a rear portion of optical chamber 104 near image sensor 130, but at an angle such that the light is not received at image sensor 130. This information can be used, for example, by ECU 134 to determine how to adjust the light blocking elements.

In some embodiments, ECU 134 can be configured to control the actuators 120 of the light blocking elements, for example, internal baffles 110A-C, external baffle 112, and/or filter element 114. ECU 134 can be wired or wirelessly connected to actuators 120. In some embodiments, ECU 134 can be a computing device having, for example, one or more processor and memory. In some embodiments, the functions of ECU 134 can be distributed across multiple processors. In some embodiments, a CPU 300 for the autonomous vehicle can perform the functions of ECU 134 and communicate with one or more cameras. In some embodiments, ECU 134 can store instructions, which can be implemented, for example, based on image information sensed by image sensor 130. Image information can include, but is not limited to, light intensity, light direction/angle, wavelength, flux, etc. In some embodiments, according to the image information, ECU 134 can actuate one or more of the actuators 120 of the light blocking elements to regulate the light reaching image sensor 130. In some embodiments, ECU 134 can store and execute algorithms to determine which light blocking elements should be adjusted. In some embodiments, ECU 134 can employ detection algorithms for objects, for example, trees, vehicles, traffic signals, etc.

Figure 2:
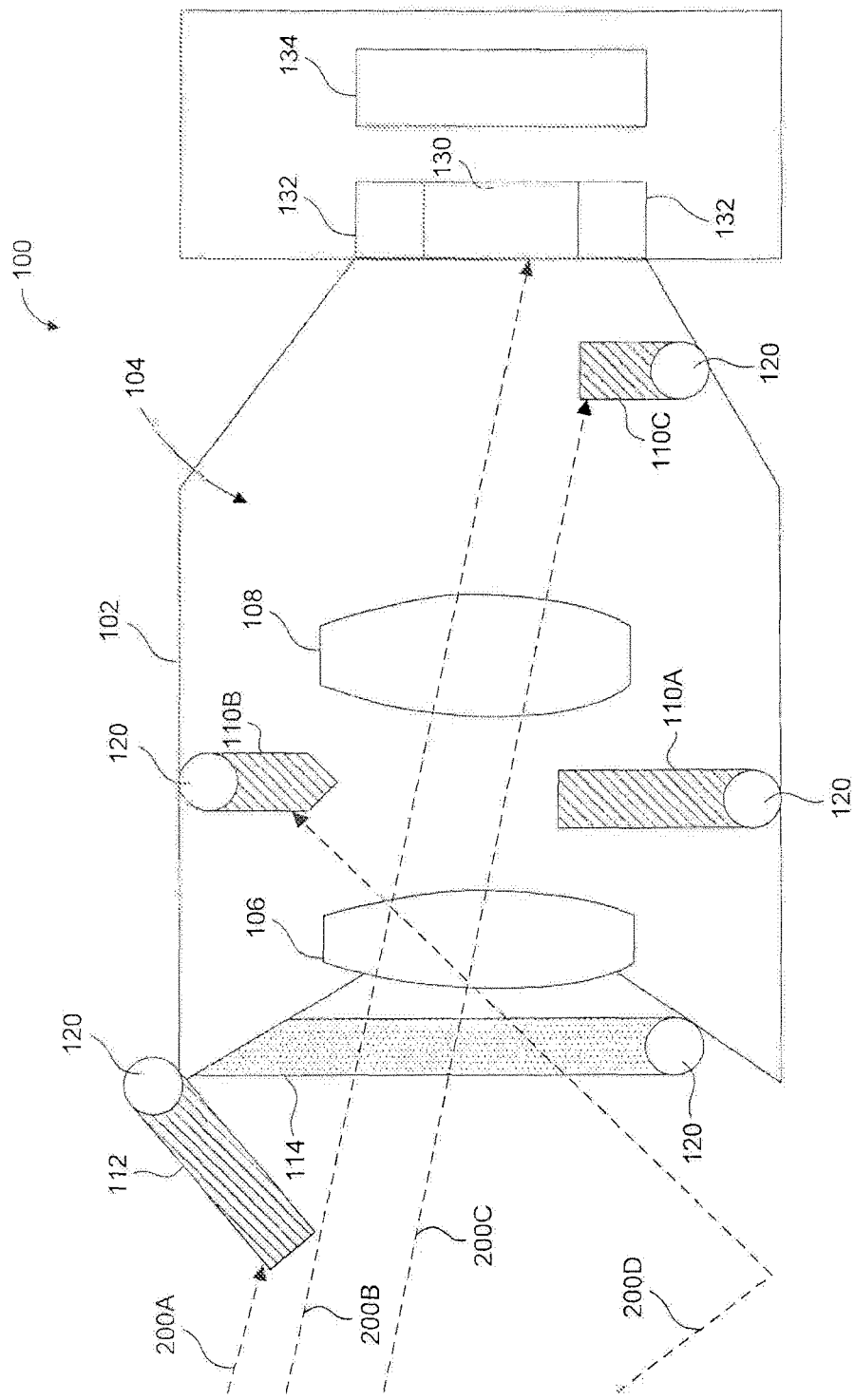
FIG. 2 illustrates the camera of FIG. 1 with incident light rays, according to an embodiment.

FIG. 2 illustrates camera 100 as shown in FIG. 1 with light rays 200A-D, according to an embodiment. Light rays 200A-D are examples of incident light rays approaching camera 100. For example, light ray 200A illustrates a light ray that is blocked from entering optical chamber 104 by external baffle 112. Light ray 200B illustrates an example of a light ray that enters optical chamber 104 of camera 100 and reaches image sensor 130. In some embodiments, a light ray such a light ray 200B can pass through, for example, filter element 114, first lens element 106, and/or second lens element 108. Light ray 200C illustrates an example of a light ray entering optical chamber 104 that is blocked by an internal baffle 110C. In some embodiments, light ray 200C can be parallel to light ray 200B, but blocked by an internal baffle 110C such that it does not reach the rear of the optical chamber 104 to be detected by image sensor 130. Light ray 200D illustrates an example of a reflected light ray, for example, a light ray that may be reflected off of a surface, such as a roadway. As shown in FIG. 2, in some embodiments, light ray 200D can enter optical chamber 104 but be blocked by an internal baffle 110B such that light ray 200D is not reflected within optical chamber 104 to reach image sensor 130. This can reduce the amount of reflected light, which can degrade the image quality, detected by image sensor 130. Depending, for example, on the desired light to be detected at image sensor 130, in some embodiments, ECU 134 can control the actuators 120 such that certain light rays are prevented from reaching image sensor 130 by blocking the light rays with light blocking elements 110, 112, and/or 114. Conversely, certain light rays can be permitted to reach image sensor 130 depending on the position or activation of light blocking elements 110, 112, and/or 114.

Figure 3:
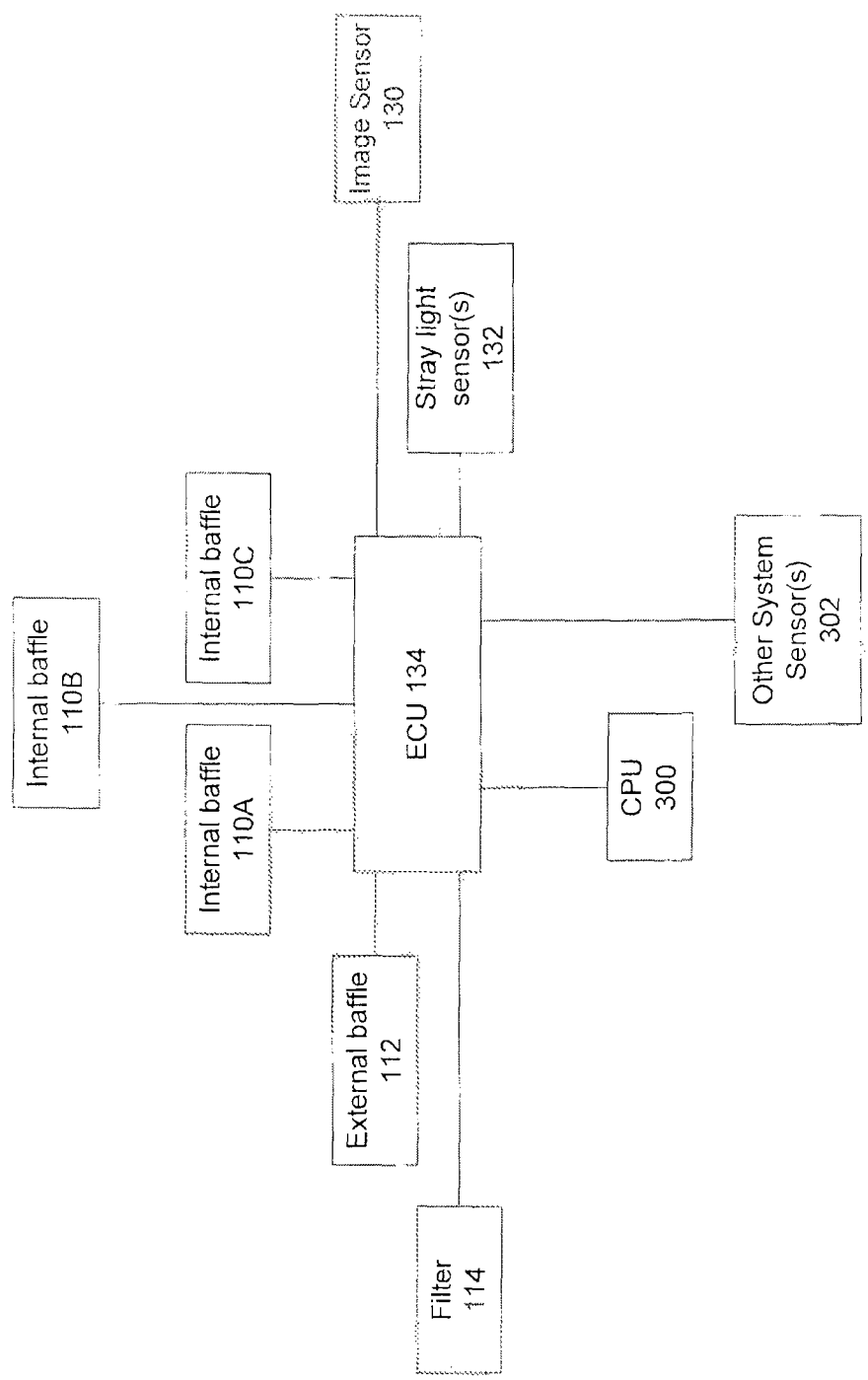
FIG. 3 illustrates a schematic of an imaging system, according to an embodiment.

FIG. 3 illustrates a schematic of an imaging system, according to an embodiment. In some embodiments, ECU 134 can communicate with other components of the imaging system and act as the primary control element. For example, ECU 134 can be coupled to internal baffles 110A-C, external baffle 112, and/or filter 114. In some embodiments, ECU 134 can be coupled to the actuators for these light blocking elements such that ECU 134 can control these light blocking elements, for example, by moving or activating the light blocking elements. In some embodiments, ECU 134 can be coupled with one or more sensors, for example, image sensor 130 and one or more stray light sensors 132. In some embodiments, image sensor 130 and stray light sensor 132 can communicate information about detected light to ECU 134. In some embodiments, based on the information received from image sensor 130 and/or stray light sensor 132, ECU 134 can communicate to the actuators of the light blocking elements to move, for example, to translate or rotate, or whether to activate a portion of an electrochromic filter.

In some embodiments, ECU 134 can be coupled to a central processing unit (CPU) 300. In some embodiments, CPU 300 can be the central control for an entire system, for example, an autonomous vehicle. In some embodiments, CPY 300 can perform the functions of ECU 134. In some embodiments, ECU 134 can be coupled with other system sensors 302, for example, but not limited to, infrared (IR) sensors, lidar sensors, and/or other sensors of a system, for example, a vehicle vision system or vehicle control system. All of the sensed information can be used to operate a vehicle, for example, an autonomous vehicle.

FIGS. 4A-C illustrate examples of scenes 400 that can be captured by camera 100, according to embodiments. In some embodiments, scene 400 can include a light source (e.g., sun 402), the sky 404, the horizon line 406, and/or the roadway 408. Other objects can also be in scene 400, for example, trees, vehicles, bridges, tunnels, traffic signs, traffic lights, roadway markings, street lamps, people, animals, or any other object that can be detected in a vehicle vision system.

FIG. 4A illustrates a scene 400 where sun 402 is outside the scene 400 captured in the field of view of the camera 100. In such a scene, the light blocking elements (for example, internal baffles 110, external baffle 112, and/or filter element 114) of camera 100 may maintain a stagnant position. In some embodiments, the light blocking elements can be actuated to allow additional light into optical chamber 104 of camera 100.

In FIG. 4B, sun 402 is partially within the captured scene 400. In some embodiments, the light blocking elements of camera 100 can be adjusted to create a blocked portion 410 of scene 400. This purposeful blocking of a portion of the scene 400, although reducing the field of image information, can reduce inaccuracies created by lighting conditions. For example, internal baffles 110, external baffle 112, and/or filter element 114 can be adjusted by the respective actuators 120 such that a portion of direct light from sun 402 does not reach image sensor 130. This can reduce glare in the captured image such that a more accurate image of the remaining surroundings can be captured by camera 100.

FIG. 4C illustrates a scene 400 where sun 402 is directly in front of the camera 100, for example, above the horizon line 406. As shown in FIG. 4C, in some embodiments, the light blocking elements of camera 100 can create a larger blocked portion 410 (in comparison to FIG. 4B) of the scene 400. As shown in FIG. 4C, in some embodiments, nearly all of the sky 404 can be blocked in the scene 400. As the sun 402 moves from the position in FIG. 4B to the position in FIG. 4C, the light blocking elements of camera 100 can be adjusted at regular time intervals, for example, by their respective actuators 120, to block the moving sun 402 in the scene 400. In some embodiments, the light blocking elements can be continuously adjusted in response to the changing light conditions in the captured scene 400. The dynamic adjustment of the light blocking elements can be a counter-measure to lighting conditions likely to produce poor image quality and operation errors of an autonomous vehicle.

FIGS. 5A and 5B illustrate scenes 500 similar to those in FIGS. 4A-C. As shown in FIGS. 5A and 5B, scene 500 can include, for example, sun 502, sky 504, horizon line 506, and road 508, along with any other objects that may be in the view field of camera 100. FIGS. 5A and 5B illustrate scenes 500 where camera 100 can use, for example, an electrochromic filter element 114 to block a portion of scene 500. As shown in FIG. 5A, in some embodiments, electrochromic filter element 114 can block specific portions of scene 500 to different degrees. For example, blocked portion 510A can be darker (i.e., more opaque) than blocked portion 510B. In some embodiments, the darker blocked portion 510A can be closer to the area of the scene 500 that is intended to be blocked, for example, the bright light of sun 502. In some embodiments, the transition from blocked portions 510A and 510B can be a gradient. Because blocked portion 510B is further from the direct light source of sun 502, it may not need to be as dark as blocked portion 510A and, therefore, some of the light from portion 510B can reach image sensor 130 of camera 100. As shown, for example, in FIGS. 5A-B, as the sun 502 moves across the scene 500 or as a vehicle changes its direction of travel, the blocked portions 510A and 510B can also be adjusted such that only portions of scene 500 that need to be blocked to improve the detected image quality are blocked by electrochromic filter element 114.

FIGS. 6A and 6B illustrate example embodiments of external baffles 112 from a front view looking toward optical chamber 104 of camera 100 (i.e., into first lens element 106). For example, as shown in FIG. 6A, in some embodiments, external baffles 112 can be generally rectangular in shape. As shown in FIG. 6B, in some embodiments, external baffles 112 can have a curved shaped, for example, similar to a waveform. Other shapes, sizes, orientations, and configurations of external baffles 112 are contemplated and can also be used.

FIGS. 7 and 8 illustrate a top view and a side view, respectively, of a vehicle 700, according to an embodiment. In some embodiments, vehicle 700 can be a motor vehicle, for example, but not limited to, an automobile (e.g., a car, truck, or SUV), a watercraft (e.g., a boat), or an aerial vehicle (e.g., a plane, helicopter, or drone). In a preferred embodiment, vehicle 700 is an autonomous automobile. In some embodiments, vehicle 700 can be an electric vehicle. Vehicle 700 can be configured to carry one or more passengers and/or a cargo load.

In some embodiments, vehicle 700 can include a front portion 702, rear portion 704, driver side 706, passenger side 708, and roof 710. As shown in FIG. 7, in some embodiments, vehicle 700 can include one or more cameras 100A-H. Vehicle 700 can include any number of cameras. One or more of the cameras 100A-H can be a camera according to any of the embodiments described herein. In some embodiments, cameras 100 can have a housing 102 approximately 2"×2"×2" in size. In some embodiments, cameras 100 can be protected by an additional housing, for example, a transparent covering.

In some embodiments, two cameras 100A and 100B can be disposed on front portion 702 of vehicle 700. In some embodiments, cameras 100A and 100B can have a forward field of view. In some embodiments, one or more cameras 100C and 100E can be disposed on driver side 706 of vehicle 700. In some embodiments, one or more cameras 100D and 100F can be disposed on passenger side 708 of vehicle 700. In some embodiments, one or more camera 100G can be disposed on rear portion 704 of vehicle 700. In some embodiments, one or more camera 100H can be disposed on roof 710 of vehicle 700. The fields of view of the cameras can be adjusted depending on the desired coverage of the vision system. In some embodiments, the image information captured by the cameras of vehicle 700 can facilitate autonomous driving of vehicle 700.

FIG. 9 illustrates a process 900 for adjusting light blocking elements of a camera, according to an embodiment. In some embodiments, at step 902 an image can be captured. For example, an image can be captured by camera 100 via image sensor 130. In some embodiments, at step 904, the captured image can be analyzed. For example, an image can be analyzed by ECU 134 and/or CPU 300. In some embodiments, image information, for example, light intensity and light direction/angle, can be analyzed. In some embodiments, at step 906, one or more light blocking elements can be adjusted. For example, one or more internal baffles 110, external baffle 112, and/or filter element 114 can be adjusted based on the image analysis.

In some embodiments, the process 900 can return to step 902 after step 906. For example, the process can be repeated for each frame captured by camera 100. Frame can be captured at regular intervals. In some embodiments, frames can be captured every 10-100 ms. In some embodiments, frames can be captured about every 40 ms.

In some embodiments, upon analyzing the image at step 904, a vehicle action can be taken at step 908. For example, the vehicle can brake, accelerate, and/or turn. In some embodiments, this can be accomplished by communicating the image information from the ECU 134 to the CPU 300 and the CPU 300 can actuate the necessary vehicle components or systems (e.g., steering system, accelerator, or wheel brakes) to execute the vehicle maneuver.

Other embodiments and combinations of elements described in the present disclosure are contemplated, for example, as provided in the following clauses:

1. A vehicle, comprising:
  a vision system having at least one camera, wherein a first camera comprises:
    an image sensor;
    an electronic control unit coupled to the image sensor; and
    a light blocking element coupled to the electronic control unit,
    wherein the electronic control unit is configured to adjust the light blocking element to regulate light received at the image sensor.
2. The vehicle of clause 1, wherein the vehicle is an autonomous vehicle.
3. The vehicle of clauses 1-2, wherein the vehicle is an electric vehicle.
4. The vehicle of clauses 1-3, wherein the vision system comprises two or more cameras.
5. The vehicle of clauses 1-4, wherein the vision system comprises twelve cameras.
6. The vehicle of clauses 1-5, wherein the first camera has a field of view in a direction of forward travel of the vehicle.
7. The vehicle of clauses 1-6, further comprising a second camera having a second image sensor, a second electronic control unit coupled to the second image sensor, and a second light blocking element coupled to the second electronic control unit,
  wherein the second electronic control unit is configured to adjust the second light blocking element to regulate light received at the second image sensor.
8. The vehicle of clause 7, wherein the first camera and the second camera are disposed on a front end of the vehicle and have a field of view in a direction of forward travel of the vehicle.
9. The vehicle of clauses 7-8, further comprising a central processing unit coupled to the first electronic control unit and the second electronic control unit.
10. The vehicle of clause 9, wherein the first and second electronic control units are configured to provide information to the central processing unit, and
  wherein the central processing unit is configured to communicate a vehicle maneuver in response to the information.
11. The vehicle of clause 10, wherein the vehicle maneuver is at least one of: braking, accelerating, or turning.
12. An imaging system for an autonomous vehicle, the imaging system comprising:
  a plurality of cameras, wherein a first camera comprises:
    an image sensor;
    an electronic control unit coupled to the image sensor; and
    at least two light blocking elements coupled to the electronic control unit, selected from the group comprising: an interior baffle, an exterior baffle, and a filter element,
    wherein the electronic control unit is configured to adjust the light blocking elements.
13. The imaging system of clause 12, wherein the light blocking elements are an internal baffle and an external baffle, and
  wherein the electronic control unit is configured to translate, rotate, or translate and rotate the internal baffle and the external baffle.
14. The imaging system of clauses 12-13, further comprising a first lens element disposed optically between the external baffle and the internal baffle, and a second lens element disposed optically between the internal baffle and the image sensor.
15. The imaging system of clauses 12-14, wherein one light blocking element is a filter disposed in optical communication with a lens element, and
  wherein the electronic control unit is configured to remove the filter from optical communication with the lens element when a light intensity detected by the image sensor is below a threshold.
16. The imaging system of clauses 12-15, further comprising a first actuator coupled to a first light blocking element and the electronic control unit, and a second actuator coupled to a second light blocking element and the electronic control unit.
17. A method of operating an autonomous vehicle, comprising:
  capturing a first image with an image sensor;
  analyzing the first image with a control unit; and
  adjusting one or more light blocking elements configured to regulate light received at the image sensor.
18. The method of clause 17, wherein adjusting a first light blocking element comprises translating the first light blocking element.
19. The method of clause 17, wherein adjusting a first light blocking element comprises rotating the first light blocking element.
20. The method of clause 17, wherein adjusting a first light blocking element comprises changing an opacity of an electrochromic filter.
21. The method of clauses 17-20, further comprising maneuvering the autonomous vehicle in response to analyzing the image with the control unit.
22. The method of clause 21, wherein maneuvering the vehicle comprises at least one of: braking, accelerating, or turning.
23. The method of clauses 17-22, further comprising:
  capturing a second image with the image sensor;
  analyzing the second image with the control unit; and
  adjusting the one or more light blocking elements.
24. The method of clauses 17-23, wherein the control unit is an electronic control unit.
25. A method of reducing glare received by a camera, comprising:
  sensing light at an image sensor of the camera;
  determining, by an electronic control unit, an adjustment of one or more light blocking elements; and
  adjusting the one or more light blocking elements to reduce light received at the image sensor.

26. The method of clause 25, wherein adjusting the one or more light blocking elements comprises adjusting a baffle disposed within an optical chamber of the camera.

27. The method of clauses 25-26, wherein adjusting the one or more light blocking elements comprises adjusting a baffle coupled to an exterior of a housing of the camera.

28. The method of clauses 25-27, wherein adjusting the one or more light blocking elements comprises adjusting an opacity of an electrochromic filter.

29. The method of clauses 25-28, wherein adjusting the one or more light blocking elements reduces a light intensity at the image sensor by at least 10 percent.

30. The method of clauses 25-29, wherein the electronic control unit is configured to determine an angle of light reaching the image sensor.

31. A non-transitory computer-readable storage device having instructions stored thereon that, when executed by at least one computing device, causes the at least one computing device to perform operations comprising:
  determining an adjustment of one or more light blocking elements for an imaging device; and
  adjusting the one or more light blocking elements to reduce light received at an image sensor of the imaging device.

32. The non-transitory computer-readable storage device of clause 31, wherein determining the adjustment comprises determining a light intensity and a light angle.

33. The non-transitory computer-readable storage device of clauses 31-32, wherein adjusting the one or more light blocking elements comprises at least one of adjusting a position of a baffle and adjusting an opacity of an electrochromic filter.

34. The non-transitory computer-readable storage device of clauses 31-33, wherein the operations further comprise maneuvering an autonomous vehicle.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the devices, systems, and methods such that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. An imaging device, comprising:
  an image sensor;
  an electronic control unit comprising a processor, coupled to the image sensor;
  a light blocking element coupled to the electronic control unit, wherein the light blocking element is configured to regulate light received at the image sensor; and
  an actuator coupled to the electronic control unit and the light blocking element, wherein the actuator is configured to both translate and rotate the light blocking element, and
  wherein the processor is configured to adjust the light blocking element in response to image information received from the image sensor.

2. The imaging device of claim 1, wherein the light blocking element comprises a baffle disposed inside an optical chamber of the imaging device.

3. The imaging device of claim 1, wherein the light blocking element comprises a baffle coupled to an exterior of a housing of the imaging device.

4. The imaging device of claim 1, wherein the light blocking element comprises a polarized filter.

5. The imaging device of claim 1, wherein the light blocking element comprises an electrochromic filter.

6. The imaging device of claim 5, wherein the processor is configured to adjust an opacity of the electrochromic filter.

7. The imaging device of claim 6, wherein the processor is configured to adjust an opacity of a first portion of the electrochromic filter and an opacity of a second portion of the electrochromic filter, wherein the opacity of the first portion is greater than the opacity of the second portion.

8. The imaging device of claim 1, wherein the actuator is electrically coupled to the electronic control unit by a wire.

9. The imaging device of claim 1, wherein the actuator is wirelessly coupled to the electronic control unit.

10. The imaging device of claim 1, further comprising one or more lens elements disposed in optical communication with the image sensor.

11. The imaging device of claim 1, wherein the image information comprises light intensity.

12. The imaging device of claim 1, further comprising a second light blocking element coupled to the electronic control unit, wherein the processor is configured to adjust the second light blocking element in response to the image information received from the image sensor.

13. The imaging device of claim 1, further comprising one or more stray light sensors coupled to the electronic control unit.

14. The imaging device of claim 1, wherein the actuator is configured to translate the light blocking element in a lengthwise direction of the light blocking element.

15. An imaging device, comprising:
  an image sensor;
  one or more lens elements disposed in optical communication with the image sensor;
  an electronic control unit comprising a processor, coupled to the image sensor;
  a first and second light blocking element coupled to the electronic control unit, wherein the first light blocking element is an interior baffle or an exterior baffle and the second light blocking element is selected from the group comprising: an interior baffle, an exterior baffle, and a filter element;
  a first actuator coupled to the electronic control unit and the first light blocking element, wherein the first actuator is configured to both translate and rotate the first light blocking element, and wherein the processor is configured to adjust the first light blocking element with the first actuator in response to image information received from the image sensor; and a second actuator coupled to the electronic control unit and the second light blocking element, wherein the processor is configured to adjust the second light blocking element in response to the image information received from the image sensor.

16. The imaging device of claim 15, wherein the first light blocking element is an interior baffle.

17. The imaging device of claim 15, wherein the first light blocking element is an exterior baffle.

18. The imaging device of claim 15, wherein the second light blocking element is a filter.

19. The imaging device of claim 15, wherein the second light blocking element is a polarized filter or an electrochromic filter.

* * * * *